US005933130A

United States Patent [19]

Wagner

[11] Patent Number: 5,933,130

[45] Date of Patent: Aug. 3, 1999

[54] ANTI-EYE STRAIN APPARATUS AND METHOD

[76] Inventor: Roger Wagner, 4280 Mount Helix Dr., La Mesa, Calif. 91941

[21] Appl. No.: 08/686,956

[22] Filed: Jul. 26, 1996

[51] Int. Cl.[6] .............................. G09G 5/10; G09G 5/00; H04N 9/74; H04N 5/52

[52] U.S. Cl. .......................... 345/147; 345/112; 345/150; 348/61; 348/578; 348/678

[58] Field of Search ............................... 345/112, 6, 102, 345/63, 147, 197, 11, 153, 150, 22; 348/61, 602, 686; 364/550

[56] References Cited

U.S. PATENT DOCUMENTS

| | | | |
|---|---|---|---|
| 3,938,139 | 2/1976 | Day . | |
| 3,976,991 | 8/1976 | Hickin et al. . | |
| 4,195,293 | 3/1980 | Margolin | 345/147 |
| 4,251,755 | 2/1981 | Bryden . | |
| 4,382,254 | 5/1983 | Ranalli | 345/147 |
| 4,414,544 | 11/1983 | Suste . | |
| 4,451,849 | 5/1984 | Fuhrer | 348/602 |
| 4,459,586 | 7/1984 | McVey . | |
| 4,929,933 | 5/1990 | McBeath et al. | 345/22 |
| 5,051,931 | 9/1991 | Cheu et al. | 364/550 |
| 5,057,744 | 10/1991 | Barbier et al. | 348/602 |
| 5,270,818 | 12/1993 | Ottenstein . | |
| 5,384,593 | 1/1995 | Gell, Jr. et al. | 345/112 |
| 5,406,305 | 4/1995 | Shimomura et al. | 345/102 |
| 5,479,186 | 12/1995 | McManus et al. | 345/11 |
| 5,515,069 | 5/1996 | Dillon, III | 345/6 |

OTHER PUBLICATIONS

Diamond Multimedia Systems, Inc., "Adjust Your Display's Brightness" (1994).

*PC World*, pp. 107–108 (Apr. 1995).

Ron White, *How Software Works,* Chapter 15: "How Bit-mapped Graphics Work," pp. 127–134 (1993).

Ron White, *How Software Works,* Chapter 19: "How a Computer Display Works," pp. 115–120 (1993).

Andre Martin, *Digital Devices,* Section 77.3: "The Cathode Ray Tube," pp. 1778–1786 (date unknown).

Munsey E. Crost and Irving Reingold, *Sources and Sensors of Infrared, Visible, and Ultraviolet Energy,* "Cathode–Ray Tubes," pp. 11–50 to 11–56 (date unknown).

Mag Innovision of Santa Ana, California, User's Manual, "Advanced Display Calibration" (1994).

Mag Innovation of Santa Ana, California, MXP17F Monitor (1994).

*Primary Examiner*—Jeffery Brier
*Assistant Examiner*—David L Lewis
*Attorney, Agent, or Firm*—Knobbe Martens Olson & Bear, LLP

[57] ABSTRACT

An anti-eye strain apparatus and method which automatically adjusts the brightness of a display to cause the muscles of the eyes of the user to adjust and refocus such that eye fatigue or tiredness is reduced or eliminated. The brightness is varied within a particular range and the brightness within this range is occasionally or periodically adjusted. The changing brightness preferably follows a predetermined pattern or cycle. These brightness changes may be perceptible or imperceptible to the viewer. The brightness of the display may be adjusted electronically or mechanically, for example by a potentiometer, by a computer attached to a monitor, for example by an application or software, or by changing the palette of colors or the gray scale.

89 Claims, 11 Drawing Sheets

ANTI-EYE STRAIN APPARATUS AND METHOD

FIELD OF THE INVENTION

The present invention relates in general to display screens and, in particular, to an anti-eye strain apparatus and method for a display screen.

BACKGROUND OF THE INVENTION

People use display screens for a wide variety of purposes. For example, display screens may be used to display specific information from devices such as oscilloscopes, radars, televisions, projection systems, and other types of electronic instruments. The information may be shown on many types of display screens such as cathode ray tubes ("CRT"), liquid crystal displays ("LCD"), and gas plasma displays.

Display screens are also frequently used in conjunction with computers. Computers are used for many purposes, including personal, educational, and work uses. People often view these display screens for extended periods of time. Extended viewing of the screen can cause eye strain and eye fatigue, leading to physical and mental discomfort for the viewer. This problem is becoming increasingly prevalent as more jobs and businesses require employees view display screens for extended periods of time.

Cathode ray tubes are a very common type of display screen used with computers. Cathode ray tubes are also used in a wide range of other applications including television picture tubes, video monitors, and oscilloscopes. As is well known, a cathode ray tube includes an electron gun which emits a stream of electrons. A first anode focuses the electrons into a narrow beam and accelerates the electrons to a greater speed. A second anode gives the electrons still more speed. Deflection coils or plates surrounding a portion of a cathode ray tube control the location at which the electron beams strike the inner surface of the display screen. The inner surface of the display screen is typically coated with a phosphor material which glows when struck by an electron to create an individual point of light.

A typical cathode ray tube display screen includes thousands of these individual points of light which create the desired image on the display screen. As is well known, a pixel or picture element is a small logical unit that is used to build an image on the display screen. A single pixel is usually created by several adjoining points of light. The fewer the dots of light used to create a pixel, the higher the resolution of the display screen.

It is known to utilize cathode ray tubes to create a color display. The color monitors that were originally used with devices such as computers had relatively crude color and graphics, and many could display only four basic colors. Current monitors, however, commonly have a palette of 256 colors. In fact, many color monitors now have the capacity to display thousands of colors. Modern monitors also often include a larger number of pixels than the older monitors, and this allows the desired image to be more accurately represented on the screen.

A typical cathode ray tube color monitor contains three electron guns, one gun for each color of red, green and blue. The electron guns send out a stream of electrons which strike the phosphors of a particular color coating the inside surface of the screen. In general, the amount of light that a particular phosphor emits is dependent upon the strength of the electron beam which strikes a given phosphor because the stronger the electron beam, the more light the phosphor emits. For example, if every red, green and blue dot in a particular pixel is struck by equally intense electron beams, the result is a white dot. As is well known, different colors, shades and brightness are obtained by varying the intensity of the electron beams striking that pixel.

After the electron beam leaves a particular phosphor, the phosphor continues to glow briefly, a condition called persistence. For an image to remain stable, the phosphor must be reactivated by repeated scans of the electron beam. When the fading of the phosphor between repeated scans of the screen becomes noticeable, the screen flickers. This flicker is ordinarily considered undesirable. Accordingly, the monitor must continually re-energize the various phosphors in the display to eliminate flicker. This continual redrawing or re-energizing of the display is the monitor's refresh rate. With a high refresh rate, the screen is more frequently redrawn and the eye of the viewer tends to see a smooth, nonflickering display. A typical cathode ray tube has a refresh rate of between about 60 and 70 cycles per second.

Early cathode ray tube display screens could only turn a particular pixel in the display on or off. This made it difficult to achieve subtle distinctions in colors because an energized pixel displayed only a single color at the same brightness. In contrast, current display screens often utilize a variable-graphics-array ("VGA") display adaptor which allows the strength of the different electron beams to vary so that the color and brightness of each pixel can be varied. This allows the monitor to display a wide range of colors because the brightness and color of each pixel is individually controlled.

In further detail, a typical cathode ray tube display used with a computer system receives signals from sources such as the operating environment or application software, and these signals are sent to the input/output hardware of the computer, which frequently contains the VGA display adaptor (the VGA display adaptor is often built into the motherboard of a personal computer). The VGA display adaptor processes the signals through a circuit called a digital-to-analog converter ("DAC"). Frequently, the digital-to-analog converter is contained within a specialized chip. Often this specialized chip contains three digital-to-analog converters in order to control the three colors used in the display.

As is known in the art, the digital-to-analog converter compares the values sent by the computer to a table that contains the matching voltage levels for the three colors needed to create the particular color and brightness. A precise amount of voltage from each electron gun then energizes each pixel to reproduce the desired color and brightness.

As the number of colors increases and the resolution of the display screens improve, a more realistic display is created, which allows more information to be conveyed to the viewer. This improved display has increased the number of users of display screens, and the amount of time which people view display screens.

Typically electronic display screens allow the brightness or intensity of the screen to be adjusted for different lighting conditions. A known method to adjust the brightness of a display screen is to use a variable resistor or potentiometer. The potentiometer allows the intensity of the electron beams to be controlled, and this allows the brightness of the display screen to be adjusted. Conventionally, a protruding knob or other rotatable member, often labeled as a brightness control knob, is connected to the potentiometer such that the user can manually adjust the brightness of the screen.

It is also well known to use a liquid crystal display ("LCD") screen for a wide variety of purposes. For example, LCDs are frequently used with computers, especially portable or notebook-type computers. As is known to one of ordinary skill in the art, LCDs are electronically switched display panels that make use of changes in the reflective properties of liquid crystals in series with an electronic field. LCDs often include a backlight or other lighting source such that a person can read the display in various lighting conditions.

Some display screens connected to a computer allow the brightness of the screen to be adjusted by the computer. For example, the Macintosh Powerbook sold by Apple Computer, Inc. allows the user to adjust the backlight of the LCD screen. The backlight of the screen is typically controlled by entering one or more commands through the keyboard or mouse of the computer. Alternatively, the backlight may be controlled by the computer executing an application or third-party software program. For example, the backlight brightness for the Powerbook computer may be adjusted by software which controls the backlight driver. As well known to one of ordinary skill in the art, the backlight driver is a standard MacIntosh driver that can be controlled by a series of commands or calls, and these calls may be used to set or change the backlight of the screen to the desired level.

In addition, some display screens may allow the color to be adjusted by a computer. For example, a company called MAG Innovision of Santa Ana, Calif., sells a product called Advanced Display Calibration which allows commands entered through a keyboard or mouse to control the color of a computer monitor.

Accordingly, the brightness and/or color of a display may be controlled by a system having these or similar capabilities.

SUMMARY OF THE INVENTION

As the use of electronic display screens has become more widespread, certain problems have also become more common. For instance, electronic display screens are now being utilized more frequently and for extended periods of time. Because the display screens are maintained at a roughly constant distance of approximately 20 inches (50 cm) from the viewer's eyes, the same eye muscles are in constant tension to focus on the screen. It is believed that this causes significant amounts of stress and fatigue in the eye muscles. This problem is often aggravated by the frequent, almost daily use of display screens.

The stress associated with viewing an electronic display screen may result in headaches or other maladies. It is believed that these problems are sometimes caused, at least in part, by the eye continuously focusing on a display screen of generally constant brightness. It is believed that because the muscles of the eye are often held in the same state for an extended period of time, extreme discomfort to the user may result because the muscles in the eye are not permitted to adjust, refocus or relax.

This problem is particularly acute with computer screens and other electronic displays that are specifically configured to have a generally constant intensity or brightness. Thus, the viewer stares at a screen from a generally constant distance and same brightness for an extended time period. Accordingly, the muscles of the eye are not given the opportunity or ability to relax or adapt to changing stimulus. The Applicant believes, for example, that less eye strain occurs in reading a book than in viewing a computer screen because each time the reader turns the page, the reader must refocus his or her eyes upon the next page and the turning of the page momentarily changes the brightness of the page. Therefore, as the eye muscles adapt to this change, tiredness and eye fatigue may be delayed or avoided.

In contrast, a computer display has no corresponding change in brightness and a user often has a tendency not to look around the room or at other objects of different brightness. Accordingly, there is a need for a computer user to occasionally adjust or refocus his or her eyes in order to avoid eye strain and fatigue.

The Applicant believes that a reduction in eye strain and fatigue will occur if the muscles of the eyes are regularly moved and adjusted. For example, the Applicant has observed that a person can only hold his or her arm in a constant outstretched position for a limited period of time, but a person regularly moving his or her arm—such as an orchestra conductor—can hold their arm outstretched for a much longer period of time. Similarly, the Applicant believes that the regular adjusting and exercising of the eye muscles will allow the person to view an electronic display screen for a much longer period of time than would otherwise be possible.

The Applicant believes the moving and adjusting of the muscles in the person's eyes should occur regularly to prevent the muscles of the eye from being held in a constant state of tension. However, Applicant believes that very active movement of the muscles of the eye should also be avoided to prevent fatigue. Accordingly, the brightness of the display is preferably adjusted so that the muscles of the eye are regularly exercised, but not to the extent that the eye muscles are fatigued.

The present invention is an anti-eye strain apparatus and method which overcomes the above-described disadvantages. The apparatus and method includes varying the brightness of the display screen to decrease eye strain of a person viewing the screen. It will be understood that the inventive concept is applicable to brightness, contrast, and backlight, as well as gray scale and color levels.

In accordance with one aspect of the invention, the brightness of a display screen varies to cause the muscles of the eye of the viewer to adjust. Preferably, the display is set to a generally acceptable level of brightness and the brightness then occasionally or periodically varies within a range about this selected general level of brightness. The changing brightness of the display preferably follows a selected pattern or cycle such that the muscles of the eyes of the viewer must occasionally adjust, avoiding eye tiredness and fatigue. These brightness changes may be substantially perceptible or imperceptible to the viewer.

Another aspect of the present invention is utilizing a computer to control the brightness of the computer screen automatically. The settings such as the range of brightness, the time for each brightness adjustment cycle, and the pattern followed in adjusting the brightness may be controlled by the user through commands entered by a keyboard or mouse. The automatic control of brightness may be implemented using application or utility software.

Yet another aspect of the present invention is an automatic screen brightness controller having brightness control software stored in a machine readable storage media and a processor is operatively connected to the storage media. The screen brightness controller is connected to a display of the type that permits the brightness to be varied and the software includes instructions that direct the brightness of the display to be varied over time in accordance with a pattern. A still further aspect of the present invention is to control the palette of colors or gray scale such that the shade of color (including gray, for example) is occasionally or periodically changed in order to reduce or eliminate eye strain of the viewer.

BRIEF DESCRIPTION OF THE DRAWINGS

These other features of the invention will now be described with reference to the drawings of preferred embodiments, which are intended to illustrate and not to limit the invention, in which.

DETAILED DESCRIPTION OF THE PREFERRED EMBODIMENTS

Figure 1:
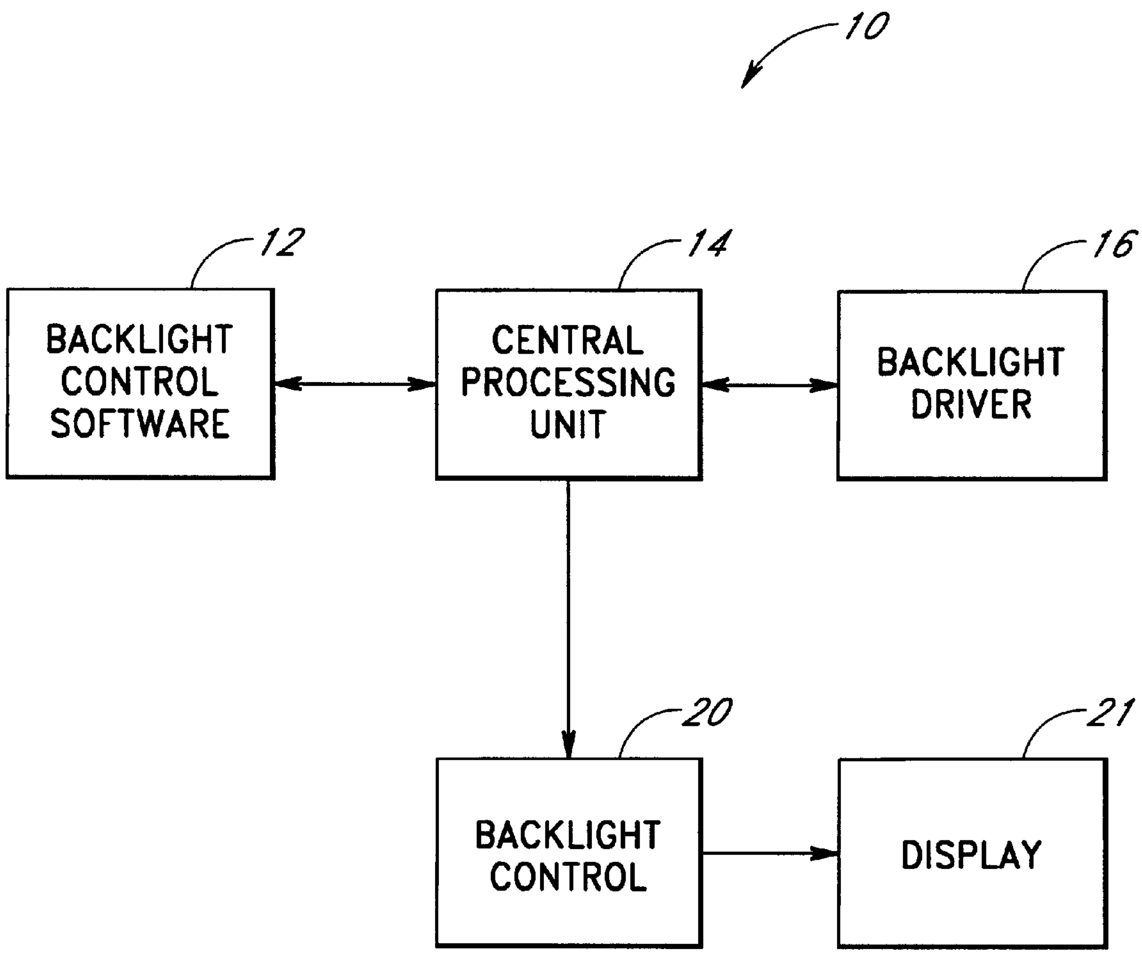
FIG. 1 is a schematic diagram of an embodiment of the invention, providing for automatic variation of the backlight of a display.

As shown in FIG. 1, an anti-eye strain apparatus and method 10 is configured in accordance with a preferred embodiment of the present invention. In this embodiment, the anti-eye strain apparatus 10 includes backlight control software 12 stored in memory (such as on the hard disk of a computer) that specifies a series of commands or steps. A central processing unit (or "CPU") 14 executes the series of commands or steps and communicates with a backlight driver 16. The central processing unit 14 sends signals to a backlight control 20 so that the brightness of an associated screen or display 21 can be controlled. The display 21 is preferably an LCD.

It will be understood that this preferred embodiment allows the central processing unit 14 to control and communicate with the backlight driver 16. It will be readily appreciated by one of ordinary skill in the art that a central processing unit 14 is typically a component of a computer and that such backlight control drivers are found, for example, in certain laptop computers, such as the Macintosh Powerbook by Apple Computer, Inc.

In greater detail, in a manner known to one of ordinary skill in the art, the central processing unit 14 preferably executes a series of steps set forth in the software 12 to control the backlight driver 16. More preferably, the central processing unit 14 executes one or more calls to the backlight driver 16, and the central processing unit 14 then sends signals to the backlight control 20. These signals are used to set the brightness of the backlight in accordance with the instructions set forth in the software 12. One of ordinary skill in the art will readily recognize that the backlight driver and backlight controls are well known in the art. Further, for example, the automatic backlight control software could be readily combined with and made a part of the backlight driver software.

It will be appreciated that the Applicant is using the central processing unit in general terms, and that one of ordinary skill in the art will understand that a central processing unit can include a variety of combinations of hardware and software that can be used to execute a series of steps.

Figure 2:
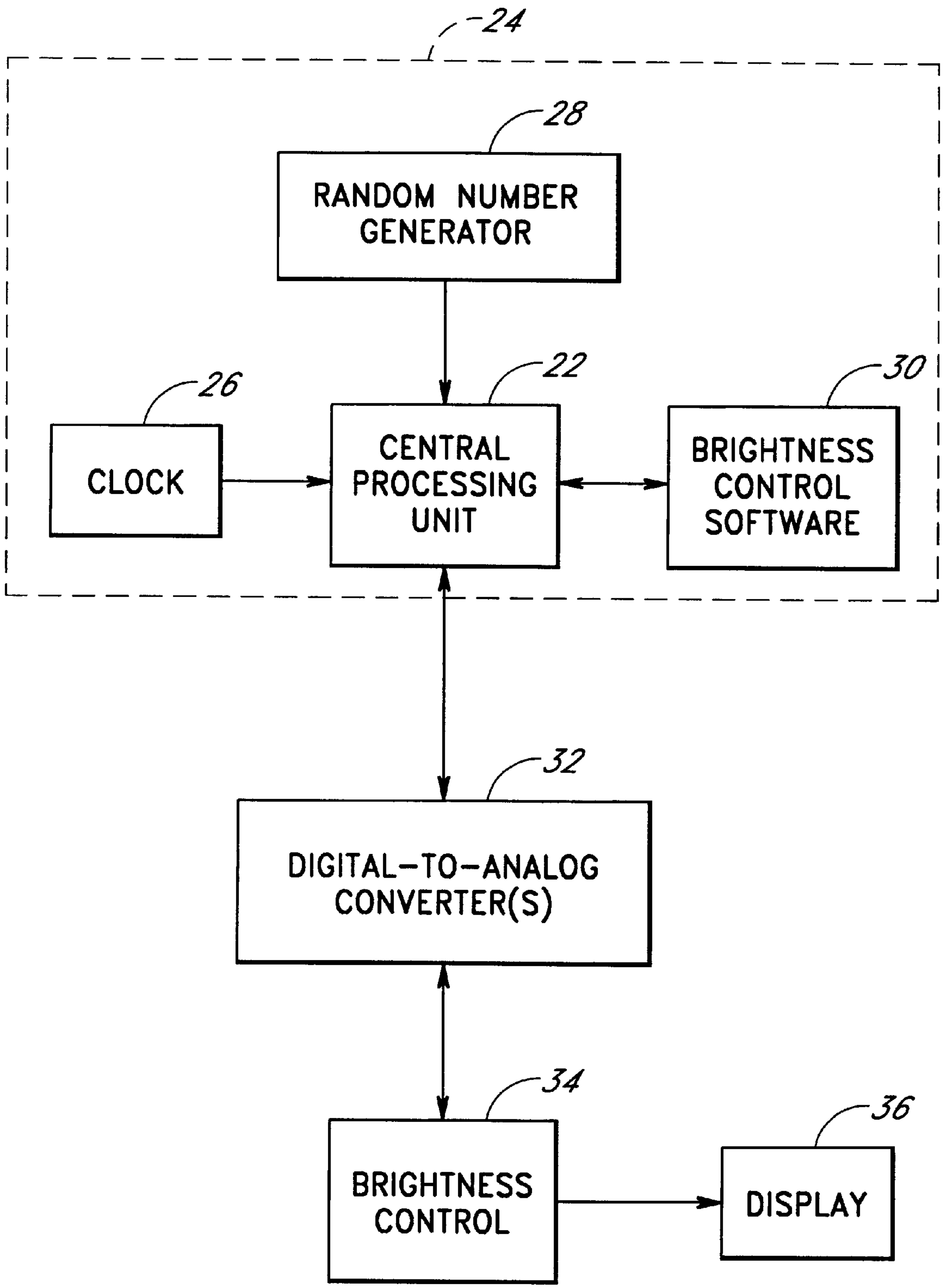
FIG. 2 is a schematic diagram of another embodiment of the present invention, providing for automatic variation of the brightness of a display.

Another preferred embodiment is shown in FIG. 2. In this embodiment the brightness is controlled by a central processing unit 22. The central processing unit 22 is preferably located within a computer 24. The computer 24 preferably includes a clock 26, a random number generator 28, and brightness control software 30. Although not shown, the computer 24 preferably has an electronic storage media such as random access memory or a hard disk. The brightness control software 30 is preferably stored in the memory of the computer 24.

The central processing unit 22 executes a series of commands or steps in accordance with the instructions set forth in the brightness control software 30. The central processing unit 22 is also in communication with a digital-to-analog converter 32. As well known in the art, the digital-to-analog converter 32 converts a digital signal (a digital number) to an analog signal (a voltage level). It will be understood that more than one digital-to-analog converter 32 may be used to convert the signal from the central processing unit 22 into an analog signal. The analog signal is then transmitted to a brightness control 34 which is used to control the brightness of a display 36. The display 36 is preferably a CRT.

Figure 3:
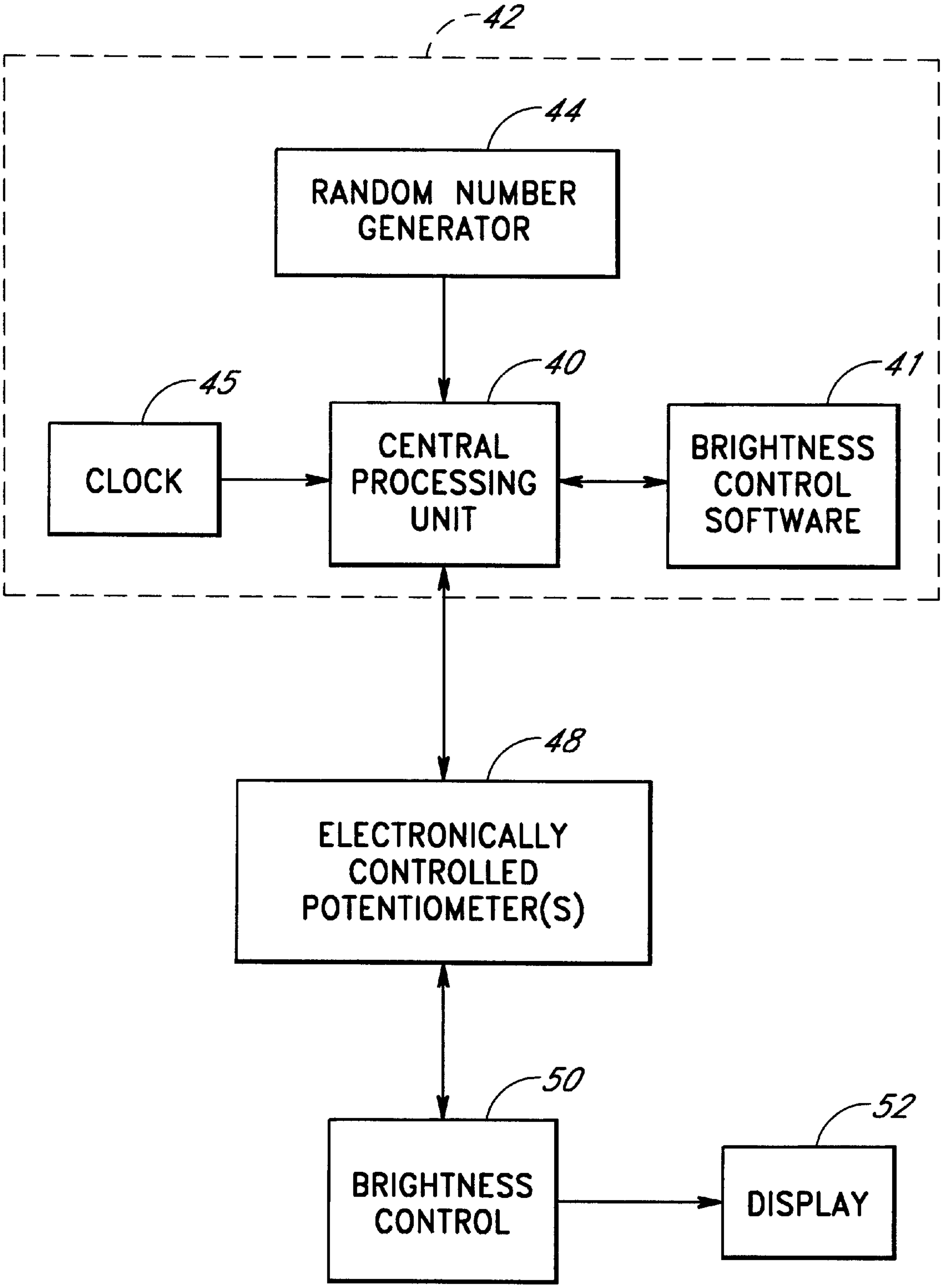
FIG. 3 is a schematic diagram of a further embodiment of the present invention, providing for automatic variation of the brightness of a display.

Another preferred embodiment is shown in FIG. 3. In this embodiment, the brightness of a display is controlled by a central processing unit 40 and brightness control software 41. The central processing unit 40 is preferably a component of a computer 42. The computer 42 preferably includes a random number generator 44, a clock 46, and the usual electronic storage media such as a hard disk and an appropriate amount of random access memory. The central processing unit 40 executes a series of commands or steps in accordance with the instructions set forth in the control software 41 and sends a signal to an electrically controlled potentiometer or variable resistor 48. It will be understood that one or more potentiometers 48 may be used to vary or control the signal from the central processing unit 40. The potentiometers 48 may be connected in series or in parallel to control the signal from the central processing unit 40. Additionally, as discussed in greater detail with respect to FIG. 11 below, the potentiometers 48 may be manually or automatically controlled. The potentiometer 48 then sends a signal to a brightness control 50 such that the brightness of a display 52 can be adjusted. The display 52 is preferably a CRT.

In each of the embodiments described in FIGS. 1, 2, and 3, the brightness or backlight of a display is controlled by a central processing unit which is responsive to the control software. It will be understood, for example, that this control software could be part of a software application, independent utility software, or operating system.

It is also contemplated that this invention may be used with many types of displays. One of ordinary skill in the art will recognize that this invention may be used with may different types of displays such as monitors, cathode ray tubes, display screens, liquid crystal displays, radar screens, oscilloscopes, gas plasma displays and the like. It will also be understood that the display may consist of a wide variety of known means to display text, information, graphics and the like.

It will also be appreciated that this application is intended to include any known method to control the backlight or brightness of a display. Additionally, it is contemplated that in addition or instead of varying the brightness or backlight level of the display, the contrast, color, and/or gray scale could be varied alone or in conjunction with one or more other features to reduce eye strain for an individual user.

Further, it will be understood that the embodiment chosen will be selected according to the type of display that is desired to be controlled. For example, an LCD is preferably used with a backlight control as shown in FIG. 1, and a CRT display is preferably used with a digital-to-analog converter as shown in FIG. 2 or an electronically controlled potentiometer as shown in FIG. 3.

In each of the embodiments described in FIGS. 1, 2, and 3, the control software and central processing unit are configured to allow the brightness or backlight of a display to be controlled. In a preferred embodiment, the brightness or backlight of the display is controlled according to a general level of brightness of the display is set at a desired level, a range in which the brightness will vary is then set—the range is preferably relative to the general level of brightness of the display, a time that the brightness varies within the selected range is also set, and the pattern for adjusting the brightness within the specific time and range is set. Thus, the general level of brightness, range of adjustable brightness, time for each brightness adjustment cycle, and pattern for varying the brightness are set and this information is used to vary the brightness of the display in a specific manner.

It will be understood that these factors—the general level of brightness, range, time and pattern—may be set in a number of ways. For example, they may be preset, dependent upon ambient lighting conditions, selected by the central processing unit or selected by the user. Preferably, these factors are set such that the brightness of the display exercises the muscle in the eye of the user to prevent or delay eye strain or fatigue.

In greater detail, the general level of brightness of the display is set to a selected level of brightness relative to the maximum brightness of the display. Preferably, the general level of brightness is expressed as a percentage of the total brightness of the display. For example, the general level of brightness may be 50 percent of the total brightness of the display. The invention is also preferably configured to vary the brightness proximate the selected general level of brightness of the display.

The range of adjustable brightness is the extent the brightness varies. For example, the range could be relatively large such that the brightness varies within a wide range. Alternatively, the range could be relatively small such that the brightness remains generally proximate a selected value. The range is preferably expressed as a percentage of the selected general level of brightness of the display. For example, if the range is 10 percent of a 50 percent general level of brightness, the range of adjustable brightness is 5 percent.

The time is the length of time for each brightness adjustment cycle. Preferably, the system is configured to allow for successive time intervals to allow the brightness of a display to be cyclically periodically adjusted.

The brightness of the display is also preferably adjusted according to a specific pattern. The pattern allows the brightness of the display to be adjusted in a controlled or specific sequence.

It will be appreciated that each of these settings may be set by the user. Alternatively, the software and central processing unit may be configured to establish each of the settings. Preferably, the user may establish some of the settings while those factors not chosen by the user are determined by the control software and central processing unit or are set to default settings. The following embodiments set forth in greater detail preferred embodiments of the invention. It will be understood, however, that any combination of these settings and value for these settings may be used to adjust the brightness of the display.

In one preferred embodiment, the user sets the general level of brightness of the display. For example, the user may set the general level of brightness of the display to 50 percent of the total brightness of the display. The range is set to a predetermined or default value, such as, for example, about 10 percent of the general level of brightness selected by the viewer. Thus, the software and the central processing unit are advantageously configured to vary the brightness of the display within a range of about 10 percent of the user-selected 50 percent general brightness level. Therefore, the brightness of the display increases and decreases a maximum of 5 percent from the general brightness level. Preferably, the brightness varies within a range centered about the general brightness level. Accordingly, in this example, the brightness would vary within the range of about 47.5 and 52.5 percent of the total brightness of the display.

It will be understood that the range of brightness does not have to be centered about the general level of brightness. For example, the general level of brightness could be the maximum brightness and the brightness would vary within a range that does not exceed this maximum brightness. Alternatively, the general level of brightness may be the minimum brightness and the brightness will automatically vary within a range that does not go below this minimum level of brightness. For example, the general brightness level may be set by the user at 70 percent of the maximum brightness level of the display, and the software may vary the brightness within a range of about 10 percent. Thus, the brightness may be varied between about 70 percent and about 77 percent of the maximum brightness level of the display.

Figure 4:
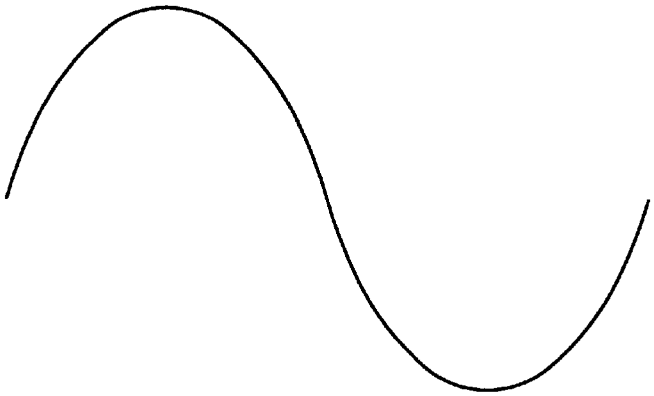
FIG. 4 is a schematic diagram of a representative pattern or cycle.
Figure 5:
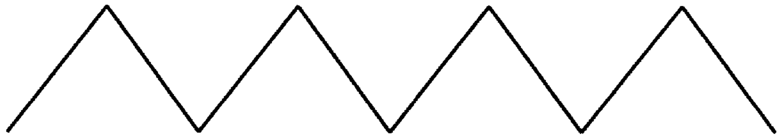
FIG. 5 is a schematic diagram of an additional pattern or cycle.
Figure 6:
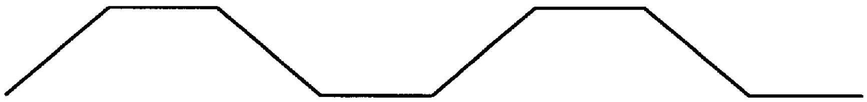
FIG. 6 is a schematic diagram of a further pattern or cycle.

In this embodiment, the time period for each brightness adjustment cycle is preferably predetermined or set to a default value, for example, of about five minutes. The pattern is also preferably predetermined or set to a default pattern. For example, the pattern preferably choose is a sine wave as shown in FIG. 4. Alternatively, the predetermined pattern may be a series of continually increasing and decreasing ramps or a saw-tooth pattern as shown in FIG. 5, or a combined ramp and step pattern as shown in FIG. 6. It will be understood that a wide range of known patterns may be selected, including a random pattern. Thus, in this example, the general level of brightness is set by the user while the range, period and pattern are preset or set to default values.

Figure 7:
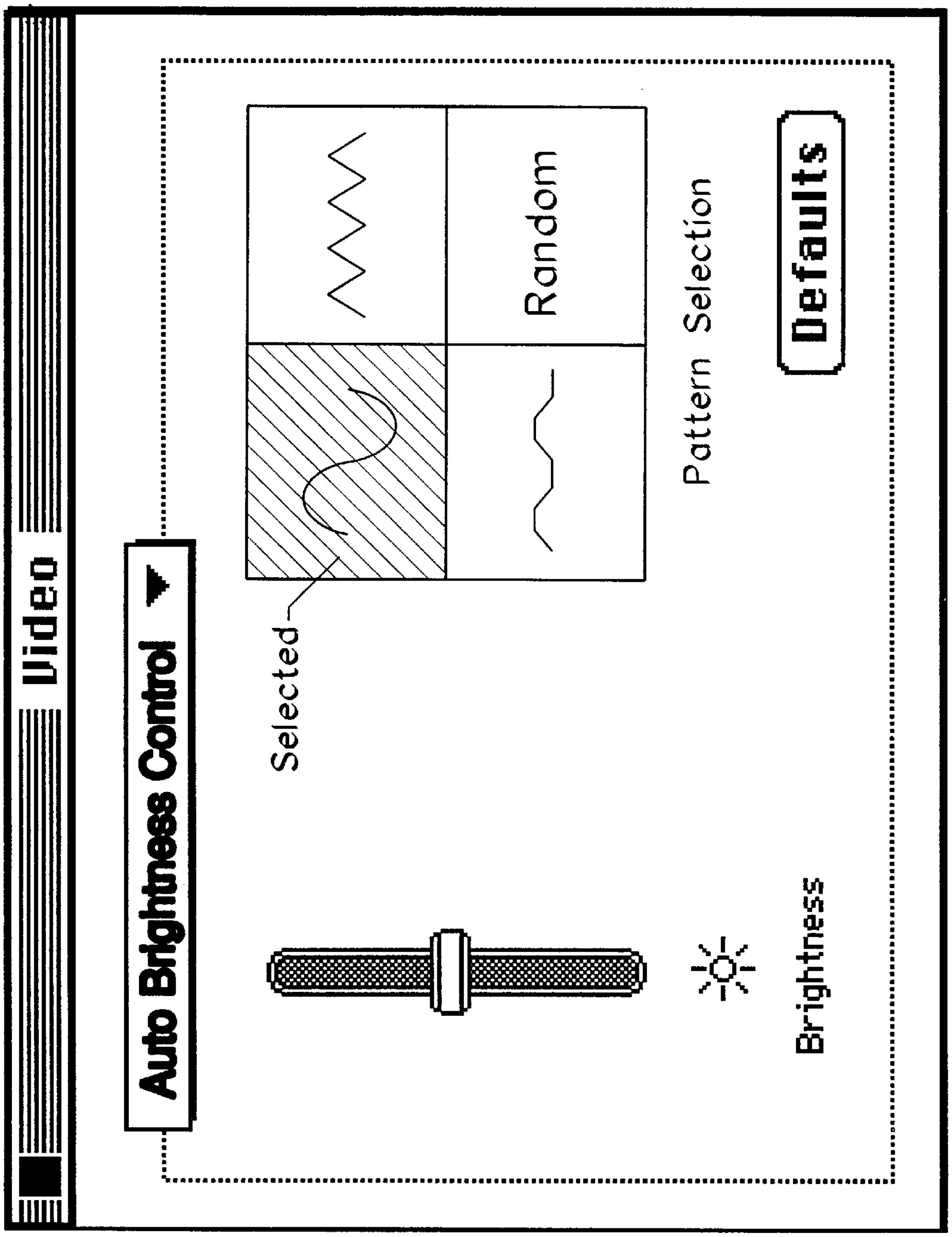
FIG. 7 is a diagram illustrating the graphical user interface of an embodiment of the invention, set up for electronically controlled brightness.

Preferably, this embodiment described above is used with a computer and CRT display. More preferably, this embodiment uses a computer having a graphical user interface, as shown in FIG. 7. The Auto Brightness Control feature seen in the graphical user interface is preferably selected by a user by a keyboard or mouse. The user then sets the brightness of display to the desired general level of brightness. In this example, the general brightness level has been set to about 50 percent. As set forth above, the range, period and pattern are set such that the brightness of the display can be automatically controlled.

Figure 8:
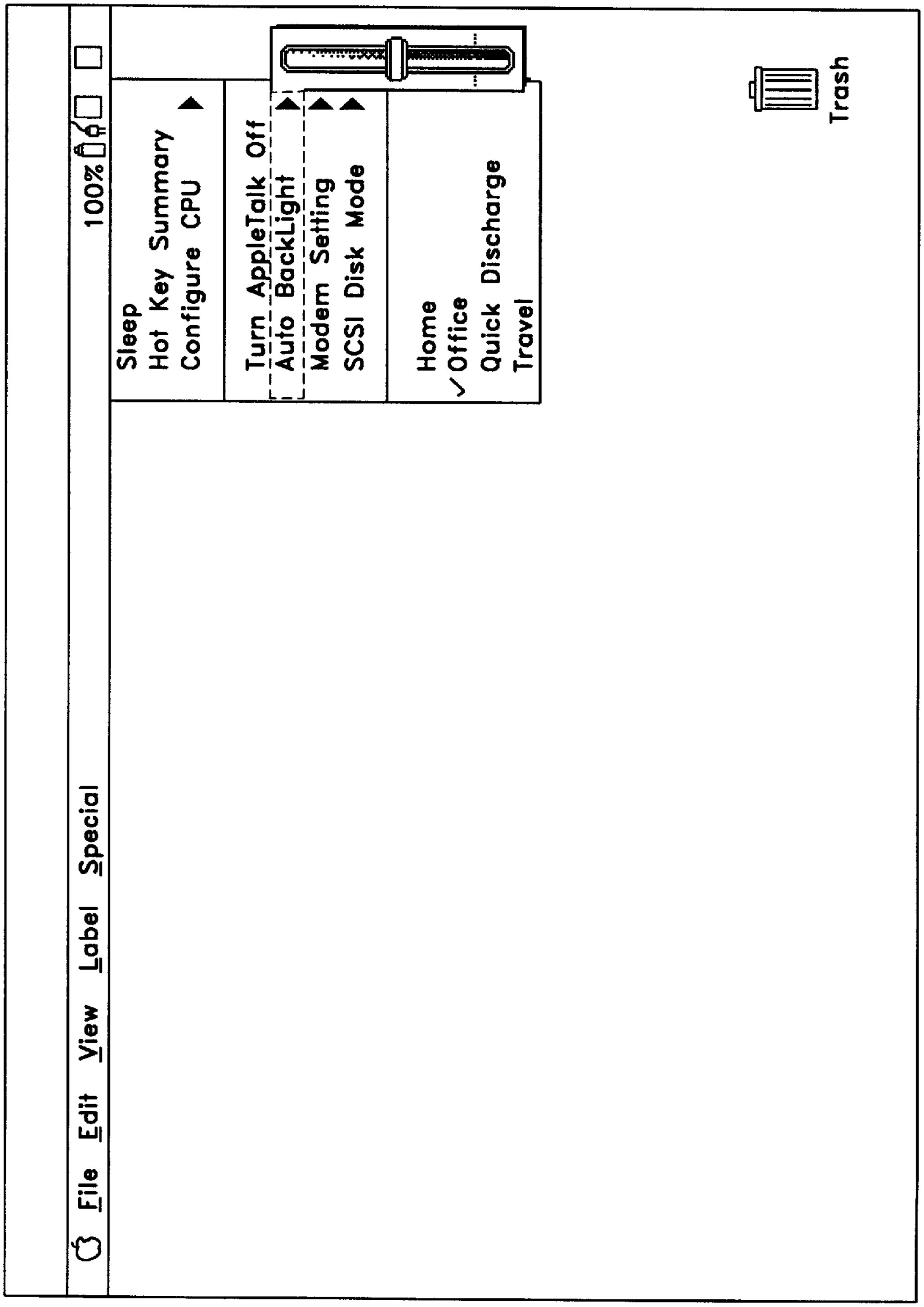
FIG. 8 is a diagram illustrating the graphical user interface of another embodiment of the invention, set up for electronically controlled backlight.

The embodiment described above can also be used in conjunction with a computer having an LCD display. For example, FIG. 8 shows a graphical user interface in which the Auto Backlight command has been selected by the user. The user then sets the backlight to the desired general level, such as 50 percent. The range, period and pattern are preferably set as set forth above such that the brightness of the display is automatically adjusted.

Figure 9:
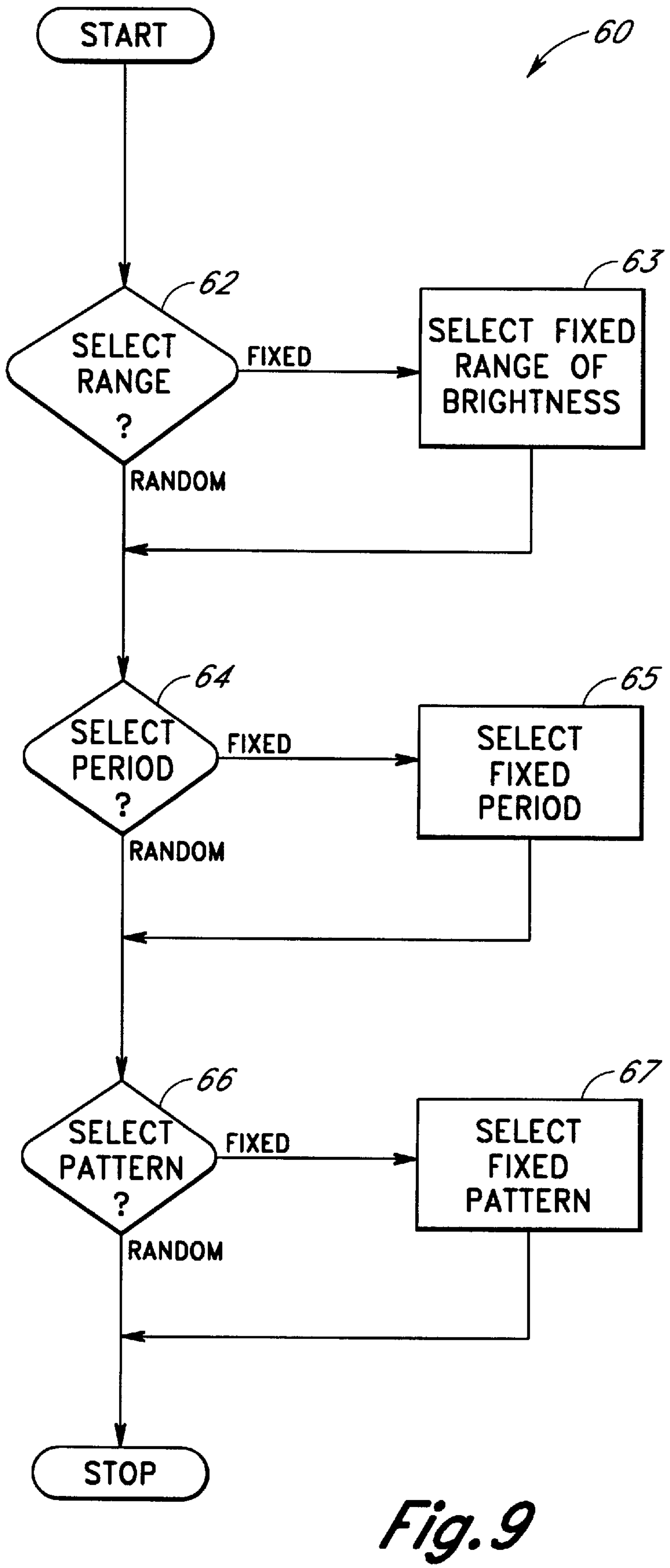
FIG. 9 is a flowchart for the software implementation of a program used by the central processing unit shown in FIG. 3.

In another embodiment, the user sets the desired general level of brightness while the central processing unit and control software determine the range, period and pattern. As seen in FIG. 9, the central processing unit of the embodiment shown in FIGS. 1, 2 and 3 preferably follows a flowchart 60 to adjust the brightness of the display. For example, the range of brightness 62 selected may be a fixed range or a random range. A fixed range of brightness, for example, may be preset before delivery to the user or selected by the user. Alternatively, the range of brightness may be randomly varied. In order to randomly select the range, the central processing unit preferably receives signals from a random number generator seen, for instance, in FIGS. 2 and 3. For example, if the random number generator supplies numbers between 1 and 256, the system is preferably configured to select a range of brightness of 5 percent for numbers between 1 and 100; a range of brightness of 10 percent is selected if the number is between 101 and 200; and a range of brightness of 15 percent is selected if the number is between 201 and 256. Accordingly, in this example, if a number between 101 and 200 is generated by the random number generator, then the range of brightness is 10 percent of the user selected general level of brightness.

In greater detail, the range through which the level of brightness can be varied, whether fixed or random, can be set anywhere between zero and 100 percent of the general level of brightness. While under some circumstances, large brightness level ranges may be appropriate, they can result in some problems. For example, if you have a brightness range of 80 to 100 percent, some text or graphics may not be easily read during the lower part of the range. Thus, a range of brightness between about 2 and about 30 percent is preferably selected and more preferably a range between about 5 and about 15 percent is selected. Most preferably, a range of brightness of about 10 percent is selected. A range of brightness of about 10 percent is preferably used as a default setting if no range is selected.

In addition, if the general level of brightness of the display is proximate the maximum brightness of the display, then a range of brightness of, for example, 10 percent, is preferable selected. However, if the general level of brightness is set near the minimum brightness of the display, the central processing unit preferably selects a relatively narrower range of brightness, for example 5 percent, because the changing brightness of the display is believed to be more noticeable to the user at a lower overall brightness level.

It will be understood that a range of brightness of 5 percent, or even less, may be selected and the display will automatically be adjusted to vary within this relatively narrow selected range, or a range of more than 10 percent may be selected such that the brightness will vary over a larger range. It will be appreciated that a relatively large range may result in automatic changes to the brightness that are generally perceptible to the viewer. Alternatively, a generally narrow range can be selected such that the changes in the brightness are substantially imperceptible to the viewer. The narrow range of 10 percent or less is preferred because when combined with a relatively slow rate of change, the variations are imperceptible to the ordinary user while providing eye-strain relief.

As shown in FIG. 9, the period 64 is also selected. The period may be a fixed time interval which is preset or set by the user. For example, a fixed period of about five minutes, or even longer, may be selected. A default interval of five minutes is preferably selected. It will be appreciated that the brightness of the display may be adjusted at intervals of less than five minutes such that the eyes of the viewer must more frequently adjust to the brightness of the display. The brightness of the display may also be adjusted at intervals of every second or even less such that the brightness is rapidly or almost constantly changing. Alternatively, the period may be randomly chosen using signals from a random number generator in a manner similar to that described above.

The selected period preferably applies to one brightness adjustment cycle and determines how long it takes that cycle to run. One cycle in the case of the sine wave is shown in FIG. 4. Preferably, the starting and ending point for the cycle at the sine wave is the midpoint of the increasing section. One cycle in the case of the ramp wave shown in FIG. 5 is one ramp up and one ramp down. Preferably, the starting point is the midpoint of the increasing section, and the ending point is the midpoint of the next increasing section. One cycle in the case of the combined ramp and step wave shown in FIG. 6 is one ramp up to the flat section, the upper flat section, one ramp down, and the lower flat section. Preferably, the starting point is the midpoint of the increasing section, and the ending point is the midpoint of the next increasing section.

In each of the embodiments of FIGS. 4, 5, and 6, the wave will be applied at the appropriate starting point for each cycle to cause the appropriate change in brightness. For example, the sine wave will preferably be applied around the selected brightness level so that half of the maximum change in brightness is higher and half is lower than the selected general level of brightness. In particular, as shown in FIG. 4, the brightness increases during the first portion of the cycle. The brightness will then decrease from the point of greatest brightness to the point of lowest brightness. The brightness then returns to the selected brightness level.

Preferably, the system is configured to allow for successive brightness adjustment cycles. More preferably, the system continues to adjust the brightness according to the selected general level of brightness, range, period and pattern until the user resets one or more of the factors or the user stops the system.

Although not shown, it is also understood that time intervals of no adjustment, where the selected range 62 and selected period 64 remain in their default settings, could be incorporated between adjustment cycles. These "silent" times could be randomly interspersed and could be of random lengths. It will be understood that these silent times can also be at times and lengths selected by either the user or the control software and control processing unit.

As shown in FIG. 9, the pattern 68 which the brightness is adjusted may be fixed or randomly selected. For example, a fixed pattern may be chosen by the user or a pattern may be preset. Alternatively, the pattern may be randomly chosen by using a random number generator in a manner similar to that described above.

The selected pattern is preferably varied in any of a wide range of known patterns, such as for example the sine wave as shown in FIG. 4, the saw-tooth pattern as shown in FIG. 5, or the combined ramp and step pattern as shown in FIG. 6. It will be understood that a wide variety of known patterns may be utilized to vary the rate of change of the brightness. Preferably, the pattern is selected such that the eye muscles of the user are adjusted an optimum amount with a minimum amount of distraction to the viewer. The Applicant believes this will reduce or eliminate eye strain and allow a user to view the display for extended time periods.

Accordingly, in this example the general level of brightness is known, the range over which the brightness varies is known, the time length of each cycle is known, and the pattern in which the brightness varies is known. The computer is configured to use this information to calculate the desired brightness for the display and the desired change in the brightness of the display.

Figure 10:
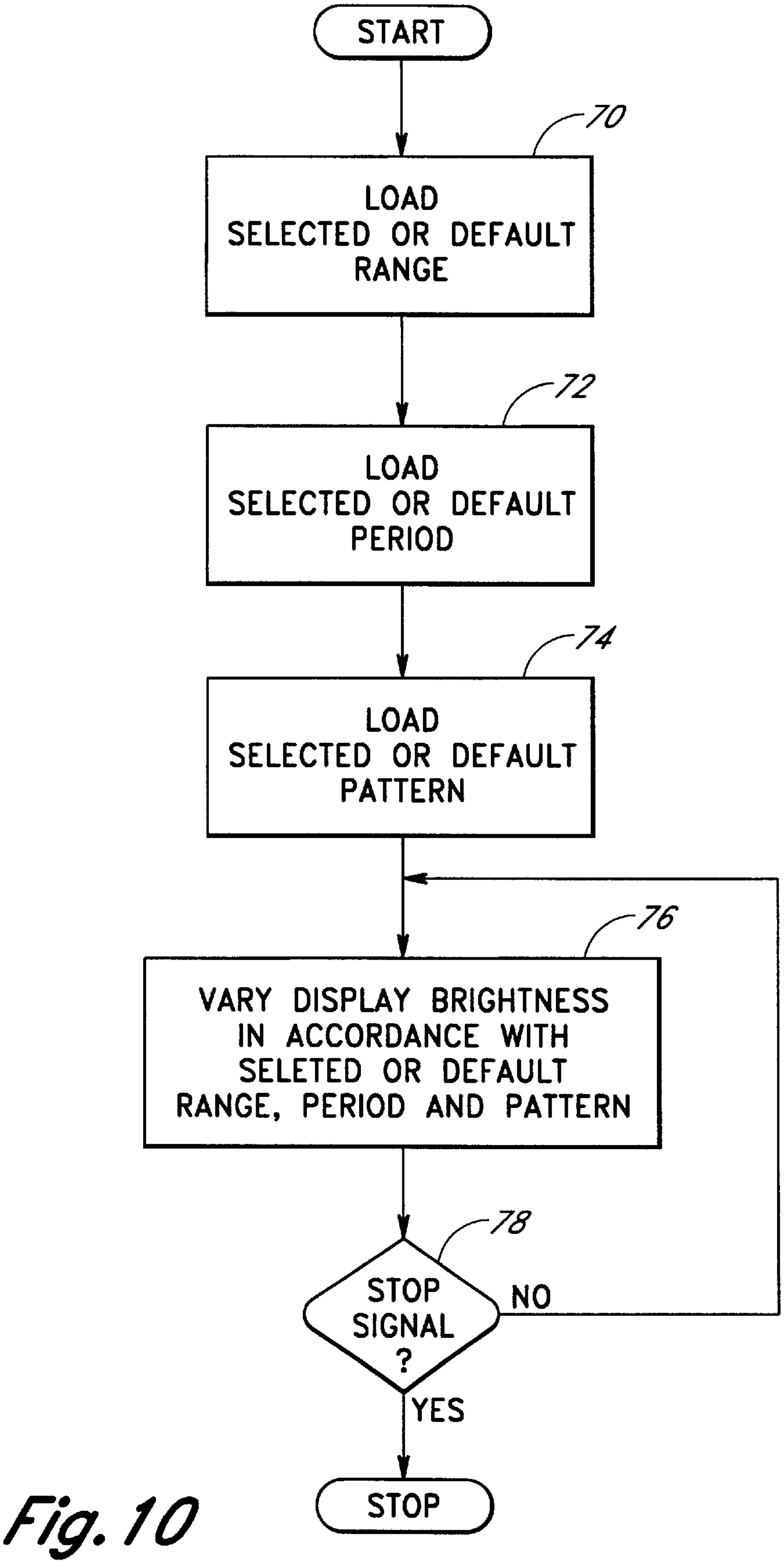
FIG. 10 is a flowchart of the operation of the embodiment of the invention shown in FIG. 9.

As shown in FIG. 10, the operation of the computer, for example, involves loading the selected or default range 70, the selected or default period 72, and the selected or default pattern 74. Loading of information into a computer is well known to one of ordinary skill in the art. The computer then uses this information to vary the display brightness in accordance with the selected or default range, period, and pattern 76. The brightness is adjusted according to the factors until a stop signal 78 is received.

It will be readily understood and appreciated that the range of adjustable brightness, the length of each brightness adjustment cycle and the pattern used to determine the changing brightness may be individually changed or changed in combination.

These factors may be adjusted such that the changes to the brightness of the display are generally perceptible to the user. This will cause the muscles in the eye of the user to adjust to these changes. More preferably, these factors are arranged such that the brightness changes are substantially imperceptible to the user. Thus, the user is adjusting the muscles in his or her eyes without being aware of the changing brightness of the display. For instance, the brightness of the display may be substantially imperceptibly changed by gradually changing the brightness over an extended time or, alternatively, the brightness may be changed very rapidly but in increments or steps that are substantially imperceptible to the user.

In a preferred embodiment, the user sets the general level of brightness for the display and the range of brightness in which the display will automatically vary is selected by the user or preset before shipping. This range is preferably between about 2 and 30 percent, more preferably between about 5 and about 15 percent and most preferably the range is about 10 percent of the total brightness range. The user then inputs the desired time of the brightness adjustment cycle and the user then selects the pattern, which is preferably a ramp with a flat top as shown in FIG. 6. The preferred period for the cycle is five minutes, one minute for each of the ramp sections of the cycle and 1 ½ minutes for the flat portions of the cycle.

In operation of this preferred embodiment, the user sets the general level of brightness of the display to about 50 percent of the total range of adjustable brightness. The user also sets the range of brightness to a random setting; a five-minute length of time for the brightness adjustment cycle; and a pattern having a ramp with a flat top as shown in FIG. 9. In this case the random number generator is used to select the range of brightness. For example, if the random number generator supplies numbers between 1 and 256, the system is advantageously configured to select a range of brightness of 5 percent for numbers between 1 and 100; a range of brightness of 7 percent is selected if the number is between 101 and 200; and a range of brightness of 10 percent is selected if the number is between 201 and 256. Accordingly, in this embodiment, if a number between 201 and 256 is generated by the random number generator, then the range of brightness is 10 percent of the general level of brightness. Thus, in this example, the brightness ranges between about 47.5 percent and about 52.5 percent of the general level of brightness, and the system is configured to adjust the brightness within the five minute period according to the ramp and step pattern shown in FIG. 6. Prior to the end of the period, a new random number is generated to select a new range of brightness for the subsequent period. This allows the system to continuously vary the brightness in the above-described manner until the user stops the system or the user changes one or more of the factors.

Figure 11:
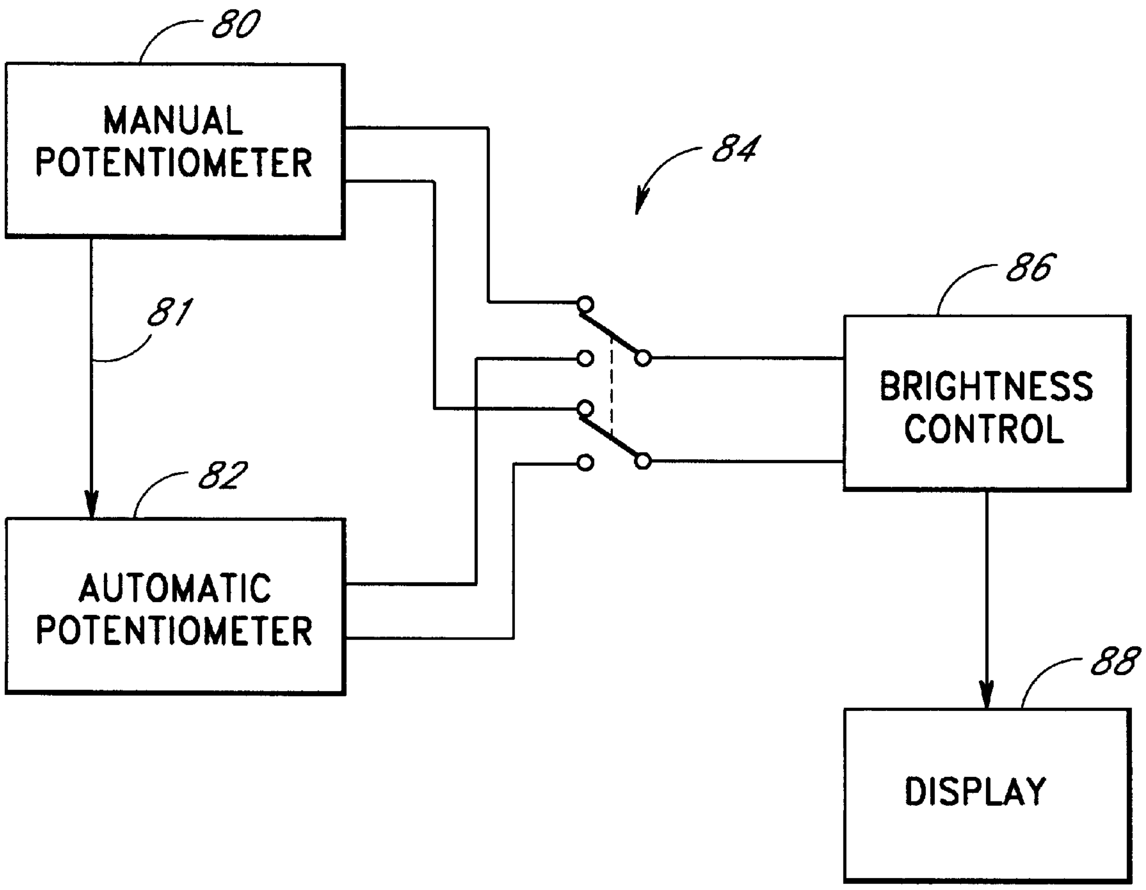
FIG. 11 is a schematic diagram of another preferred embodiment of the present invention, providing for automatic variation of brightness of any computer that may be connected thereto.

As seen in FIG. 11, in another preferred embodiment, in a system so equipped, a manual potentiometer 80 is used in conjunction with an automatic potentiometer 82. The manual potentiometer 80 and the automatic potentiometer 82 may be connected by a switch 84 as shown in FIG. 11, or the manual and automatic potentiometers may be connected in series or in parallel according to the desired arrangement of the potentiometers. The manual potentiometer 80 is preferably a conventional brightness control for a display. A switch 84 preferably allows either the manual potentiometer 80 or the automatic potentiometer 82 to send a signal to a brightness control 86. The brightness control 86 is used to control the brightness of a display 88. It will be understood that this manual potentiometer 80, for example, may be manually set by the user and adjusted according to the ambient lighting conditions. It will also be understood that a potentiometer is intended to include variable resistors, solid-state devices, or the like which may be used to vary the resistance or voltage that appear across the device.

The automatically controlled potentiometer 82 is preferably configured to work in conjunction with the manual potentiometer 80 such that the user can readily change the brightness of a display by adjusting the manual potentiometer 80 to the desired general level of brightness. The automatically controlled potentiometer 82 monitors the brightness level that is set by the manual potentiometer 80 over a line 81. Then when it is desired to automatically vary the brightness, the automatic potentiometer 82 is switched in using switch 84. The automatic potentiometer 82 preferably includes the elements shown in FIG. 3, meaning the central processing units 40, the brightness control software 41, the random number generator 44, and the electronically controlled potentiometer 48. Note that an automatic potentiometer of this type could be incorporated into a monitor independent of any computer connected to the monitor by providing all these elements, including a special purpose processor in the monitor itself. The automatic potentiometer is then used to automatically vary the brightness of the display relative to the general level of brightness selected by the user in a manner similar to that discussed above. This change in brightness causes the muscles in the eyes of the viewer to adjust, which prevents or delays the eye fatigue or tiredness commonly associated with displays that have a generally constant brightness.

Figure 12:
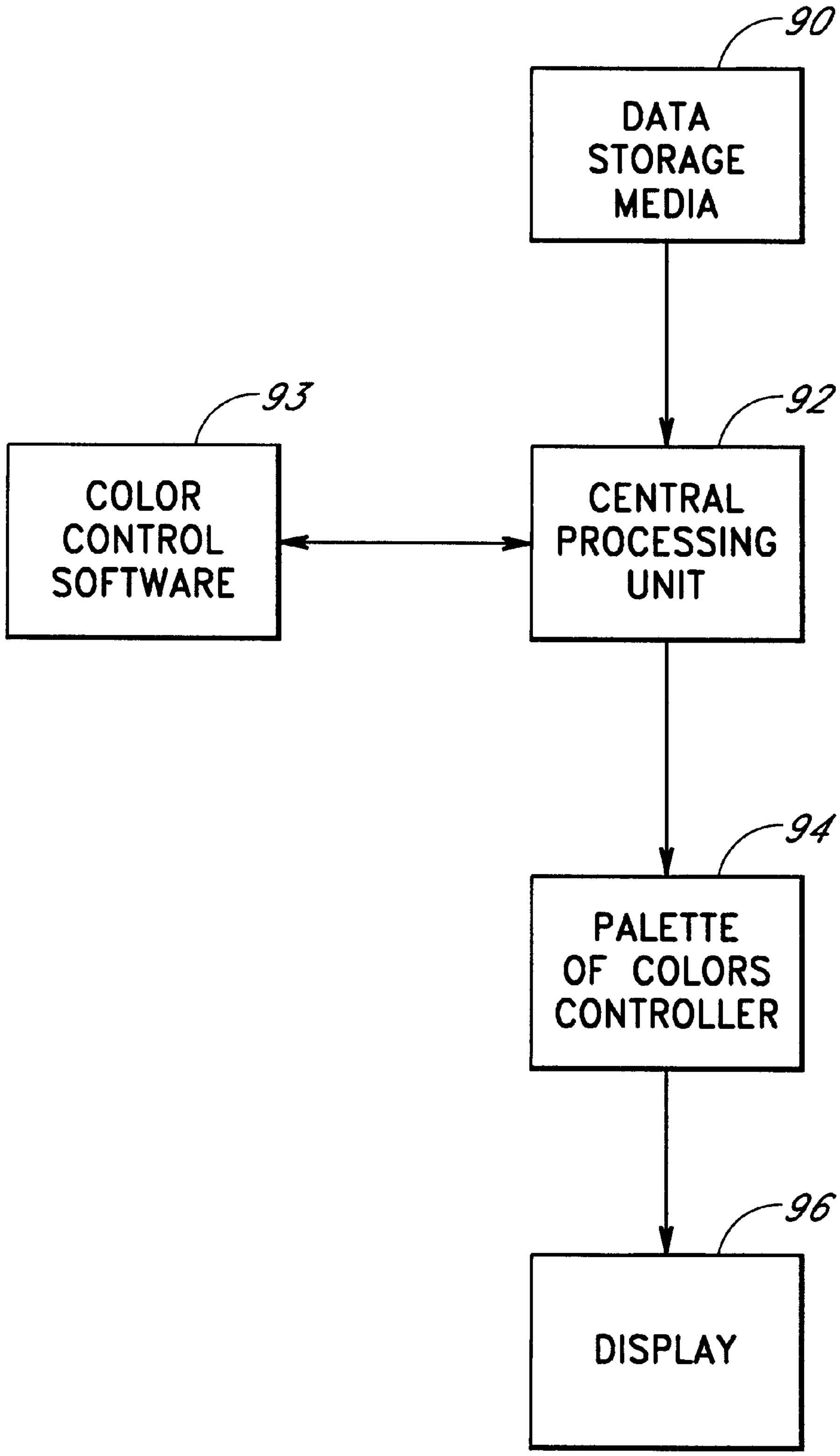
FIG. 12 is a schematic diagram of another preferred embodiment of the present invention, wherein the colors are varied.

In another embodiment of the invention, as seen in FIG. 12, a display can also be adjusted to eliminate or reduce eye fatigue and tiredness by adjusting the palette of colors. Many displays currently have a palette of 256 colors and often newer displays provide thousands of colors. The different colors within the palette are typically numbered in a known manner to indicate the particular color and the specific shade of that color. The present invention preferably changes the particular shades of the colors to occasionally or periodically cause the muscles of the eyes of the user to adjust. For example, in a manner similar to that discussed above, the number of a particular color for a specific pixel could be increased or decreased a desired amount, such as by subtracting 2, so that the shade of the color is varied. More preferably, each color in the display is changed at one time, so that all the shades are changed simultaneously. Most preferably, the changes are implemented by a central processing unit in a manner similar to that described above, but instead of changing the brightness, the numerical value of the colors are changed. This changing of the shades of the colors is believed to exercise the eye muscles of the user to eliminate eye fatigue and tiredness.

As seen in FIG. 12, a data storage media 90 such as a hard disk drive of a computer, for example, stores a character string which allows the number corresponding to a particular color and shade of color to be determined. A central processing unit 92 is connected to the data storage 90 to access the stored information. Color control software 93 stored in memory (such as the data storage media 90) specifies a series of commands or steps. The central processing unit 92 executes the series of commands or steps according to the instructions set forth in the software 93 and sends a signal to a palette of colors controller 94.

The palette of colors controller 94 uses this information to determine the number corresponding to a particular color in a display 96. The color palette controller 94 is configured to allow the number corresponding to a particular color to be occasionally or periodically adjusted for a specified time such that the shade of that color is changed. The color is preferably changed within a specified range according to a predetermined pattern or cycle in a manner similar to that discussed above. This allows the brightness of the display 96 to be adjusted such that the user must occasionally or periodically adjust or refocus his or her eyes.

Figure 13:
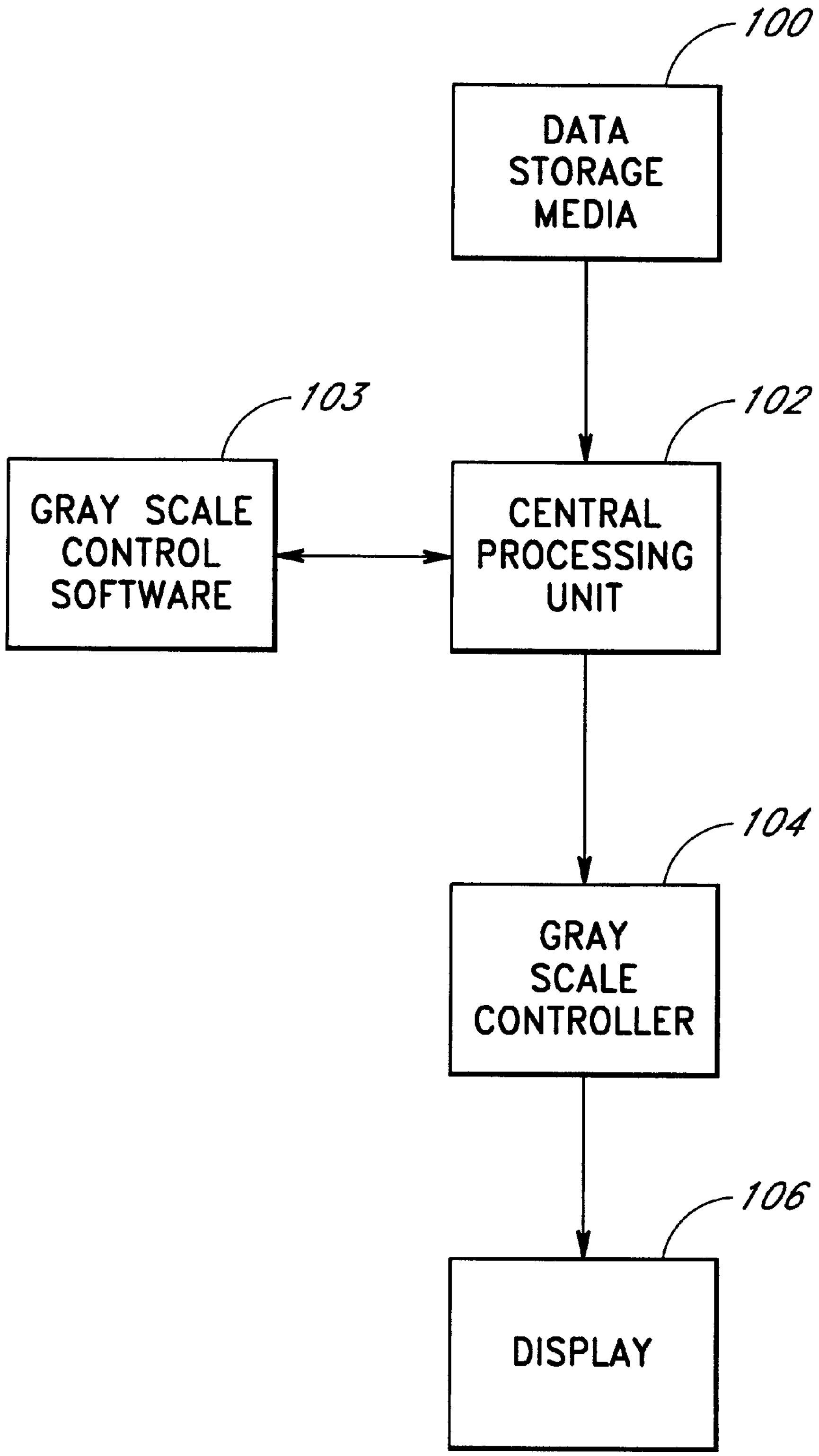
FIG. 13 is a schematic diagram of another preferred embodiment of the present invention, wherein the gray scale is varied.

As seen in FIG. 13 in another preferred embodiment of the present invention, the gray scale is occasionally or periodically adjusted. The varying of the gray scale is used to reduce or eliminate eye fatigue in a manner similar to that described above. In FIG. 13, a data storage media 100, such as a hard disk of a computer, stores a character string which allows the level of the gray scale to be determined. A central processing unit 102 is connected to the data storage 100 to access the stored information. Gray scale control software 103 stored in memory (such as the data storage media 100) specifies a series of commands or steps. The central processing unit 102 executes the series of commands or steps according to instructions from the software 103 and sends a signal to a gray scale controller 104. The gray scale controller 104 uses this information to occasionally or periodically vary the gray scale of a display 106 for a specified time. The gray scale is preferably changed within a specified range according to a predetermined pattern or cycle in a manner similar to that discussed above.

It will be understood that systems made in accordance with the invention can be designed for monochrome or color displays. In a color display, the brightness can be mechanically controlled by one or more potentiometers, variable resistors or other types of variable current devices. In particular, because the color and brightness of a particular pixel is controlled by the strength of the three electron beams striking the pixel, one preferred embodiment, described above, varies the voltage levels applied to one or more of the three electron guns such that the brightness is adjusted without changing the color. This allows the brightness of the display to be adjusted without changing the color.

Although this invention has been described in terms of certain preferred embodiments, other embodiments apparent to those of ordinary skill in the art are also within the scope of this invention. Accordingly, the scope of the invention is intended to be defined only be the claims which follow.

I claim:

1. An automatic screen brightness controller for reducing eye strain, comprising:

brightness control software stored in a machine readable storage media;

a processor operatively connected to said storage media; and a display of the type that permits the brightness to be varied;

said brightness control software including instructions that direct the brightness of substantially the entire display to be varied during a plurality of sequential time intervals in accordance with a predetermined pattern that gradually varies the brightness over an extended time interval during at least a portion of each of the plurality of the sequential time intervals to reduce the eye strain and exercise the eye muscles of a person observing the display.

2. An automatic screen brightness controller as in claim 1, wherein said brightness control software varies the brightness within a range.

3. An automatic screen brightness controller as in claim 1, wherein said brightness control software varies the brightness within a range, wherein said range is randomly selected.

4. An automatic screen brightness controller as in claim 1, wherein said brightness control software varies the brightness within a range, wherein said range is selected by a user.

5. An automatic screen brightness controller as in claim 1, wherein said brightness control software varies the brightness within a range, wherein said range is between about 5 and 50 percent of the total range of brightness of the display.

6. An automatic screen brightness controller as in claim 1, wherein said sequential time intervals are randomly selected.

7. An automatic screen brightness controller as in claim 1, wherein said sequential time intervals are selected by a user.

8. An automatic screen brightness controller as in claim 1, wherein said sequential time intervals are between about 60 and 300 seconds.

9. An automatic screen brightness controller as in claim 1, wherein said pattern is randomly selected.

10. An automatic screen brightness controller as in claim 1, wherein said pattern is selected by a user.

11. An automatic screen brightness controller as in claim 1, wherein said pattern is a sine wave.

12. An automatic screen brightness controller as in claim 1, wherein said pattern is a series of increasing and decreasing ramps.

13. An automatic screen brightness controller as in claim 1, wherein said pattern is a combined step and series of increasing and decreasing ramps.

14. An automatic screen brightness controller as in claim 1, wherein the brightness of the display is periodically varied within a range of less than 50% of the total brightness of the display.

15. An automatic screen brightness controller as in claim 1, wherein the brightness of the display is randomly varied.

16. An automatic screen brightness controller as in claim 1, wherein a rate of change of the brightness of the display is substantially imperceptible to a user.

17. A method of adjusting the brightness of a screen to reduce eye strain, said method comprising:

providing brightness control software stored in a machine readable media;

providing a processor operatively connected to said storage media;

providing a display; and automatically varying the brightness of the display over a series of sequential time intervals in accordance with a pattern that varies the brightness gradually during at least a portion of the series of sequential time intervals;

wherein the brightness is varied for at least one second during a portion of the sequential time intervals; and wherein said method acts to exercise the eye muscles.

18. The method of claim 17, wherein said brightness control software varies the brightness within a range.

19. The method of claim 18, wherein said range is between about 5 and 50 percent of the total range of brightness of the display.

20. The method of claim 17, wherein said sequential time intervals are between about 60 and 300 seconds.

21. The method of claim 17, wherein the brightness of the display is periodically varied.

22. The method of claim 17, wherein the brightness of the display is randomly varied.

23. The method of claim 17, wherein a rate of change of the brightness of the display is substantially imperceptible to a user.

24. An apparatus for varying the intensity of a display, comprising:

a central processing unit;

a backlight driver, said central processing unit sending one or more calls to said backlight driver to adjust the backlight of the display; and a backlight control, said backlight control receiving a signal from said backlight driver to control the backlight of the display;

wherein the backlight of the display is adjusted over a series of sequential time intervals in accordance with a predetermined pattern;

wherein the time intervals and pattern are such that the variation of the intensity of the display is done gradually over an extended time interval during at least a portion of the pattern and wherein the intensity variation occurs whether or not there are changes in the ambient environment in which the display resides.

25. An apparatus as in claim 24, wherein said central processing unit is responsive to a software program to vary the backlight of the display.

26. An apparatus as in claim 24, wherein said backlight control varies the backlight within a range.

27. An apparatus as in claim 24, wherein said backlight control varies the backlight over a time period.

28. An apparatus as in claim 24, wherein said backlight control varies the backlight according to a pattern.

29. An apparatus as in claim 24, wherein the display is the display for a lap top computer.

30. An apparatus for varying the intensity of a display, comprising:

a processor;

a controller interface;

an electronically controlled potentiometer; and means for periodically and automatically varying the intensity of the display in accordance with a repeating predetermined pattern;

wherein the intensity of the display is varied for at least one second during at least a portion of the repeating pattern.

31. An apparatus as in claim 30, wherein said means for automatically adjusting the intensity of the display varies the intensity of the display within a series of sequential time intervals.

32. An apparatus as in claim 30, wherein said means for automatically adjusting the intensity of the display varies the intensity of the display within a selected range.

33. An apparatus as in claim 30, wherein said means for automatically adjusting the intensity of the display varies the intensity of the display according to a selected pattern.

34. An apparatus as in claim 30, further comprising an input/output hardware responsive to said signal from said central processing unit.

35. An apparatus as in claim 30, wherein said central processing unit includes a random number generator and a clock.

36. An apparatus as in claim 35, wherein said central processing unit determines the time at which the intensity of the display is to be adjusted.

37. An apparatus for varying the intensity of a display, comprising:

a processor generating a signal to change the intensity of substantially the entire display in accordance with a predetermined pattern, the intensity of the display changing gradually over an extended time interval during at least a portion of the pattern and the intensity change occurs whether or not there are changes in the ambient environment in which the display resides;

a controller interface responsive to said signal from said processor; and an electronically controlled potentiometer to vary the brightness of the display.

38. An apparatus for varying the intensity of a screen display, comprising:

an input signal;

a first potentiometer to manually adjust a level of said input signal; and a second potentiometer cooperating with said first potentiometer to automatically adjust the level of said input signal;

wherein the intensity of the screen display is varied over a series of sequential time intervals in accordance with a predetermined pattern;

wherein the time intervals and pattern are such that the variation of the intensity of the display is done gradually over an extended time interval during at least a substantial portion of the pattern and wherein the intensity variation occurs whether or not there are changes in the ambient environment in which the display resides.

39. An apparatus as in claim 38, wherein said first potentiometer and said second potentiometer are connected in series.

40. An apparatus as in claim 38, wherein said first potentiometer and said second potentiometer are connected in parallel.

41. An apparatus as in claim 38, wherein said second potentiometer randomly varies a range through which the intensity of the screen display changes.

42. An apparatus as in claim 38, wherein said second potentiometer varies the intensity of the screen display according to a predetermined pattern.

43. An apparatus as in claim 38, wherein said second potentiometer adjusts the intensity over an extended period of time.

44. An apparatus as in claim 38, wherein said second potentiometer adjusts the intensity in a manner that is substantially imperceptible to a viewer of the screen display.

45. An apparatus for varying the intensity of a display, comprising:

a first potentiometer to manually adjust the intensity of the display, said first potentiometer having a first range of intensity; and a second potentiometer to automatically adjust the intensity of the display, said second potentiometer having a second range of intensity;

wherein the intensity of the display varies within said second range of intensity according to a predetermined pattern and wherein the brightness is varied for at least one second during a portion of the pattern to exercise the eye muscles of a person observing the display.

46. An apparatus as in claim 45, wherein the intensity of the display is adjusted at specific times.

47. An apparatus as in claim 45, wherein the intensity of the display is adjusted according to a predetermined pattern.

48. An apparatus as in claim 45, further including a random number generator, a clock, and a microprocessor, said microprocessor determining the time at which the brightness of the display is adjusted.

49. An apparatus for varying the intensity of a screen display, comprising:

a first brightness control device;

a second brightness control device; and means for continuously and automatically adjusting said second brightness control device throughout each of a series of sequential time intervals;

wherein the adjusting of said second brightness control device is done gradually over an extended time interval during at least a portion of the sequential time intervals and wherein the adjusting of said second brightness control device occurs whether or not there are changes in the ambient environment in which the screen display resides.

50. An apparatus as in claim 49, wherein said means for automatically adjusting said second brightness control device varies the intensity of the screen display within a selected range and according to a selected pattern.

51. An apparatus, comprising:

a data storage medium;

a color palette stored in said data storage medium, said color palette using numbers to identify color shades; and a color shade controller to continuously and automatically vary the color shades of a color display over a series of sequential time intervals;

wherein the color shade is varied within a desired range and in accordance with a desired pattern; and wherein the color shade is gradually varied over an extended time interval during at least a portion of the series of sequential time intervals.

52. An apparatus, comprising:

a data storage medium;

a gray scale stored in said data storage medium, said gray scale using numbers to identity a level of said gray scale; and a grey scale controller to automatically vary the level of said grey scale such that the eye muscles of a person observing the screen are exercised over a series of sequential time intervals;

wherein the grey scale is varied within a desired range and in accordance with a desired pattern; and wherein the grey scale is gradually varied over an extended time interval during at least a portion of the series of sequential time intervals.

53. A method of varying the intensity of a screen display to reduce eye strain comprising, providing a screen display;

providing a plurality of patterns, each of said patterns having a desired range in which the intensity of the screen display is varied and a desired time period in which the intensity of the screen display is varied;

selecting a pattern from the plurality of patterns; and continuously and automatically varying the intensity of the screen display over a series of sequential time intervals in accordance with said selected pattern;

wherein each pattern includes a portion that gradually varies the intensity over an extended time interval.

54. The method of claim 53, wherein the intensity is a brightness of the display.

55. The method of claim 53, wherein the intensity is a gray scale of the display.

56. The method of claim 53, wherein the intensity is a color shade of the display.

57. The method of claim 53, wherein a range through which the intensity varies is randomly selected.

58. The method of claim 53, wherein a range through which the intensity varies is selected by a user.

59. The method of claim 53, wherein the sequential time intervals are randomly selected.

60. The method of claim 53, wherein the sequential time intervals are selected by a user.

61. The method of claim 53, wherein the intensity follows a pattern which is randomly selected.

62. The method of claim 53, wherein the intensity follows a pattern which is selected by a user.

63. The method of claim 53, wherein the intensity is a contrast of the display.

64. The method of claim 53, wherein the intensity is a backlight of the display.

65. A system for varying the intensity of a screen display, comprising:

a first automatically controlled potentiometer;

a second automatically controlled potentiometer; and a manually controlled potentiometer, said first automatically controlled potentiometer connected in series with said manually controlled potentiometer, said second automatically controlled potentiometer connected in parallel with said manually controlled potentiometer, the system manually and automatically controlling the intensity of the screen display;

wherein the intensity of the screen display is randomly varied during, at least a portion of a series of sequential time intervals.

66. A system for varying the intensity of a screen display as in claim 65, wherein the intensity is varied within a range that is randomly selected.

67. A system for varying the intensity of a screen display as in claim 65, wherein the intensity is varied during a time period that is randomly selected.

68. An apparatus for varying the intensity of a screen display to reduce eye strain, comprising means for providing a plurality of patterns, each of said patterns having a desired range in which the intensity of the screen display is varied and a desired time period in which the intensity of the screen display is varied;

means for selecting a pattern from the plurality of patterns; and means for continuously and automatically varying the intensity of the screen display over a series of sequential time intervals in accordance with the selected pattern;

wherein each pattern includes a portion that varies the intensity for at least one second.

69. The apparatus of claim 68, wherein the intensity is varied randomly.

70. A screen display intensity controller to reduce eye strain, comprising:

software instructions stored in storage media;

a plurality of patterns stored in said storage media, each of said patterns having a desired range of intensity and a desired time period in which the intensity of the screen display is varied; and a processor responsive to said software instructions to continuously vary the intensity of a screen display for at least one second in accordance with a selected pattern from the plurality of patterns.

71. The intensity controller of claim 70 wherein the intensity variation is periodic.

72. The intensity controller of claim 70 wherein the intensity variation is random.

73. The intensity controller of claim 70 wherein the intensity of the screen display being varied is the brightness and the rate of the brightness is imperceptible to the ordinary user.

74. Software stored on a machine readable media; said software including instructions continuously directing the intensity of a screen display to be varied over time in accordance with a predetermined pattern in which the intensity of the screen display is gradually varied for at least one second during a portion of the pattern to reduce eye strain of a person viewing the screen display.

75. An automatic screen controller for reducing eye strain, comprising:

control software stored in a machine readable storage media;

a processor operatively connected to said storage media; and a display of the type that the intensity can be varied;

said control software including instructions that direct the intensity of the display to be varied over a series of sequential time intervals in accordance with one or more predetermined patterns;

wherein the time intervals and patterns are such that the variation of the intensity of the display gradually changes over an extended time interval during at least a portion of the patterns; and wherein these variations occur whether or not there are changes in the ambient environment in which the display resides.

76. An automatic screen controller as in claim 75, further comprising time periods in which the brightness is generally constant are interspaced between the sequential time intervals.

77. An automatic screen controller as in claim 76, wherein the time periods are randomly selected.

78. An automatic screen controller for reducing eye strain, comprising:

control software stored in a machine readable storage media;

a processor operatively connected to said storage media; and a display of the type that permits the intensity to be varied;

said control software including instructions that direct the intensity of the display to be varied over a series of sequential time intervals in accordance with a predetermined pattern, wherein the intensity is varied for at least one second during a portion of the sequential time intervals.

79. A method of gradually adjusting a display to prevent eye strain, said method comprising:

providing control software stored in a machine readable media;

providing a processor operatively connected to the storage media;

providing a display;

varying the display within a selected range, the display being varied by adjusting one or more of the following: intensity, brightness, contrast, backlight, gray scale and color levels;

varying the display within a selected time period, the display being varied by adjusting one or more of the following: intensity, brightness, contrast, backlight, gray scale and color levels; and varying the display according to a selected pattern, the display being varied by adjusting one or more of the following: intensity, brightness, contrast, backlight, gray scale and color levels;

wherein the display is gradually changed over an extended time interval during at least a portion of the time period; and wherein a person observing the display periodically refocuses, moves or adjusts their eyes because of the display variations.

80. A method to reduce eye strain, comprising:

providing a display; and varying the display for at least one second during a series of sequential time intervals, the display being varied by varying one or more of the following: intensity, brightness, contrast, backlight, gray scale and color level;

wherein the display is varied according to a preselected range, the display being varied by varying one or more of the following: intensity, brightness, contrast, backlight, gray scale and color level; and wherein the display is varied according to a preselected pattern, the display being varied by varying one or more of the following: intensity, brightness, contrast, backlight, gray scale and color level;

wherein the display is gradually changed during the one second.

81. The method of claim 80, wherein the display is varied whether or not there are changes in the ambient environment in which the display resides.

82. The method of claim 80, wherein the display has a generally constant brightness during selected intervals between the sequential time periods.

83. The method of claim 80, wherein the display is varied such that a person observing the display must refocus, move or adjust their eyes during at least a portion of the series of sequential time periods because of the display variations.

84. A method of setting a screen display to reduce eye strain of a person viewing the screen display, comprising:

selecting a pattern from a plurality of patterns in accordance with which a display is desired to be varied, the display being varied by varying one or more of the following: intensity, brightness, contrast, backlight, gray scale and color level;

selecting a range in accordance with which the display is desired to be varied, the display being varied by varying one or more of the following: intensity, brightness, contrast, backlight, gray scale and color level; and selecting a time for an interval during which the display is desired to be varied in accordance with the selected pattern and range;

wherein each pattern includes a portion that gradually varies the display over an extended time interval.

85. An automatic screen controller for reducing eye strain, comprising:

control software stored in a machine readable storage media;

a processor operatively connected to said storage media; and a display of the type that permits the intensity to be varied;

said control software including instructions that direct the intensity of the display to be varied for at least one second during at least a portion of a series of sequential time intervals in accordance with a predetermined pattern;

wherein the eyes of a person observing the display are adjusted or refocused during at least a portion of the series of time intervals because of the intensity variation.

86. An automatic screen controller as in claim 85, further comprising time intervals in which the intensity is generally constant are interspaced between the sequential time intervals.

87. An automatic screen controller as in claim 85, wherein the sequential time intervals are randomly selected.

88. An automatic screen controller as in claim 85, wherein said control software varies the intensity within a range, wherein said range is randomly selected.

89. A method of adjusting the brightness of a screen to reduce eye strain, said method comprising:

providing brightness control software stored in a machine readable media;

providing a processor operatively connected to said storage media;

providing a display; and automatically varying the brightness of the display over time in accordance with a pattern;

wherein the brightness is varied for at least one second.

* * * * *

UNITED STATES PATENT AND TRADEMARK OFFICE

CERTIFICATE OF CORRECTION

PATENT NO. : 5,933,130

DATED : August 3, 1999

INVENTOR(S) : Roger Wagner

It is certified that error appears in the above-identified patent and that said Letters Patent is hereby corrected as shown below:

Column 18, Line 9, "identity" should be changed to "identify"

Signed and Sealed this

Twenty-first Day of November, 2000

Attest:

Q. TODD DICKINSON

*Attesting Officer* *Director of Patents and Trademarks*